(12) United States Patent
Zagalsky et al.

(10) Patent No.: US 10,911,583 B1
(45) Date of Patent: Feb. 2, 2021

(54) SYSTEM AND METHOD FOR PROCESSING A NETWORK MESSAGE

(71) Applicant: INSIDE PACKET LTD, Yakum (IL)

(72) Inventors: Michael Zagalsky, Hod Hasharon (IL); Michael Frank, Karnei Shomron (IL); Eli Karpilovski, Herzlia (IL)

(73) Assignee: INSIDE PACKET LTD., Yakum (IL)

( * ) Notice: Subject to any disclaimer, the term of this patent is extended or adjusted under 35 U.S.C. 154(b) by 0 days.

(21) Appl. No.: 16/924,389

(22) Filed: Jul. 9, 2020

(51) Int. Cl.
  *H04L 29/08*  (2006.01)
(52) U.S. Cl.
  CPC .................. *H04L 69/324* (2013.01)
(58) Field of Classification Search
  CPC ....................................................... H04L 69/324
  See application file for complete search history.

(56) References Cited

U.S. PATENT DOCUMENTS

| | | | | |
|---|---|---|---|---|
| 6,970,462 | B1 * | 11/2005 | McRae | H04L 41/0893 370/392 |
| 8,856,203 | B1 * | 10/2014 | Schelp | G06F 12/02 709/200 |
| 2002/0152209 | A1 * | 10/2002 | Merugu | H04L 47/2441 |
| 2011/0044341 | A1 * | 2/2011 | Sundstrom | H04L 69/22 370/392 |
| 2015/0295816 | A1 * | 10/2015 | Roper | H04L 41/14 709/224 |
| 2017/0134538 | A1 * | 5/2017 | Mahkonen | H04L 49/70 |
| 2019/0215021 | A1 * | 7/2019 | Frishnnan; Ofer | H04L 69/22 |

* cited by examiner

*Primary Examiner* — Shailendra Kumar
(74) *Attorney, Agent, or Firm* — Pearl Cohen Zedek Latzer Baratz LLP

(57) ABSTRACT

A system and method for processing a packet may include (a) defining a mapping-function that produces, based on a set of attributes of a packet and based on an iteration value, a location of a flow state entry (FSE) in a state-table; (b) applying the mapping-function to an incoming packet and processing the packet according to data in the FSE at the produced location; (c) modifying the iteration value; and (d) repeating steps (b) and (c).

19 Claims, 5 Drawing Sheets

(A) DEFINING A MAPPING-FUNCTION THAT PRODUCES, BASED ON A SET OF ATTRIBUTES OF A PACKET AND BASED ON AN ITERATION VALUE, A LOCATION OF A FLOW STATE ENTRY (FSE) IN A STATE TABLE ~510

(B) APPLYING THE MAPPING-FUNCTION TO AN INCOMING PACKET AND PROCESSING THE PACKET ACCORDING TO DATA IN THE FSE AT THE PRODUCED LOCATION ~515

(C) MODIFYING THE ITERATION VALUE ~520

(D) REPEATING STEPS A AND B ~525

SYSTEM AND METHOD FOR PROCESSING A NETWORK MESSAGE

FIELD OF THE INVENTION

The present invention relates generally to processing network messages. More specifically, the present invention relates to extending the capacity of a device and/or system by increasing the number of processing (match-and-action or match-action) stages of the device or system.

BACKGROUND OF THE INVENTION

Data traffic in computer networks is forwarded and processed by network processing devices, such as switches and routers or smart network interface cards (NICs) devices. These devices typically implement a packet processing pipeline (hereinafter pipeline). For example, programmable pipeline devices (PPDs) may be, or may include, application-specific integrated circuit devices (ASICs), field programmable gate arrays (FPGAs), programmable logic devices (PLDs), system on a chip (SOC) and the like.

A pipeline typically includes a set or sequence of stages. A stage may be, for example, a physical part or component in a programmable device programmed or otherwise adapted to process a packet. A stage may be viewed as a component or unit adapted to examine an process a packet, e.g., each stage in a PPD may include executable code stored in a memory, and the stage may include or use a controller to execute executable code. Upon receiving a packet, a stage in a pipeline typically searches a table for an entry corresponding to or matching the packet (a match as referred to in the art and herein), and, if a match is made or found, the stage processes the (matched) packet according to information in the entry (an action as referred to in the art and herein). Accordingly, as referred to in the art and herein, stages are match-and-action units.

Stages in a pipeline process a packet serially, according to their fixed order. Generally processing a packet by a pipeline includes processing the packet by the first stage in the pipeline, forwarding the packet to the second or next stage in the pipeline, and so on. More specifically, a stage may select whether or not to process a packet; however, a packet travels through all stages, even if some of the stages merely receive and forward the packet untouched.

Tables used by stages are referred to in the art and herein as lookup tables (or look up or look-up or state tables). Lookup tables typically include information that describes a flow's state. For example, a lookup table may include a large number of flow state entries (FSEs), where each FSE includes a description or other data related to a specific flow. When processing a packet, a unit (e.g., stage as described) may map, associate or match the packet to/with an FSE and process the packet based on information in the FSE.

A flow may be, may include, or may be defined as a set of packets that include (or share) a common attribute. A common attribute of packets in, or of a flow, may be a common or same value in a header of the packets, e.g., a flow may be, may include or may be defined by all packets that include the same destination internet protocol (IP) address (DIP address). A common attribute may be determined or calculated based on any number of parts or portions of a packet. For example, a flow may be, may include or may be defined by or based on all packets that include the same DIP and the same source IP address (SIP), or a flow may be all packets with the same DIP and the same SIP and, in addition, the same value in a specific offset in the packet (e.g., a value in the payload of a packet).

For example, as described by the Internet Engineering Task Force (IETF), a flow is defined as defined as a set of packets or frames passing an observation point in the network during a certain time interval. All packets belonging to a particular flow have a set of common properties. Each property is defined as the result of applying a function to the values of: 1) one or more packet header fields (e.g., destination IP address), transport header fields (e.g., destination port number), or application header fields (e.g., real time protocol (RTP) header fields), 2) one or more characteristics of the packet itself (e.g., number of Multi-protocol label switching (MPLS) labels), and 3) one or more fields derived from packet treatment (e.g., next hop IP address, output interface).

Since attributes of packets defining a flow may be extracted from any part (or network layer) of the packets, e.g., from the application layer (L7 as known in the art), a flow may be, may include, or may be defined based on a set of packets related to a specific service or a specific application, for example, possibly in addition to values in headers, a common attribute defining a flow may be, or may include, a common value in a specific offset in the application layer portion of packets. Typically, when processing an incoming or received packet, a key value (or simply a key) is constructed or calculated, e.g., by each or some of the stages in a PPD. A key is typically used for mapping a packet to a flow within the scope of a specific stage, application or service.

A key is typically defined, constructed or calculated based on the packet, e.g., based on values in headers and/or content of/in the packet and/or any attribute of the packet. Keys (or key values) are calculated or constructed such that they are unique with respect to flows, that is, keys are constructed such that no two or more flows have the same key (or key value). At each stage in a PPD, packets are typically mapped to flows using a key, e.g., a key may be used, at each stage of a PPD, to perform a lookup in a flows Lookup Table (LUT) in order to find an entry that stores the state of, or other information related to a packet.

Accordingly, as viewed, processed or treated by a PPD, a flow may be, may include or may be defined by the set of packets for which the same key (or key value) is constructed or calculated. Typically, a specific service or application is provided or supported for a specific flow, and, accordingly, by identifying a flow, a stage in a PPD may know, identify or determine the relevant service or application that is to be provided.

A key generated or created for a packet is used, e.g., by a PPD, for the match part in a match-action stage, scheme, paradigm, e.g., the key is used to find (match) an entry in a lookup table that matches the packet (or determine there is no match if an entry does not exist or cannot be found in the table), for example, a key's value may be an index or offset pointing to an entry in a state table.

Current and/or known systems and methods suffer from a number of drawbacks. For example, the number of services or applications a device or system can handle simultaneously, per packet, is limited, e.g., a PPD can provide or support a single service per packet.

SUMMARY OF THE INVENTION

An embodiment for processing a packet may include (a) defining a mapping-function that produces, based on a set of attributes of a packet and based on an iteration value, a location of a flow state entry (FSE) in a state-table; (b) applying the mapping-function to an incoming packet and processing the packet according to data in the FSE at the produced location; (c) modifying the iteration value; and (d) repeating steps b and c. An embodiment may repeat steps b and c until the iteration number reaches a predefined value, wherein repeating steps b and c includes providing the packet to the device's ingress. A first set of stages in a device may be used in a first iteration of steps b and c, and a second set of stages may be used in a second, subsequent iteration of steps b and c.

An embodiment may provide a first service if the iteration value is smaller than a threshold value, and the embodiment may provide a second service, which is different from the first service, if the iteration value is greater than the threshold value. The threshold value may be a programmable value. An embodiment may select a service to provide based on an iteration value. A state-table may be selected, from a set of state-tables, based on an iteration value. An embodiment may chain first and second services by: providing the first service for a first range of iteration values; and providing the second service for a second range of iteration values that is different from the first set of iteration values.

A number and an order of chained services may be set by associating a plurality of services with a respective plurality of iteration values ranges. An embodiment may execute first and second applications by: executing the first application if the iteration value is within a first range of values; and executing the second application if the iteration value is within a second range of values that is different from the first set of iteration values. Processing a packet, by an embodiment, may include producing a modified packet, and looping the modified packet through an egress back to an ingress.

An embodiment may add metadata to a packet and the embodiment may process the packet based on at least one of: the metadata, an iteration value and an attribute of the packet. An embodiment may apply, to a packet, a mapping-function which provides a reference to an entry in a state-table. An embodiment may be or may be included in a programmable pipeline device which, when processing a packet, applies a mapping-function and modifies an iteration number.

An embodiment may perform at least one action, the action being selected based on information in an FSE. An embodiment may perform at least one of: adding an FSE to a state-table, removing an FSE from a state-table and updating an FSE in a state-table. An embodiment for processing a packet, may, iteratively: apply a mapping-function to a set of attributes of a packet and to an iteration value to produce a reference to an FSE in a state-table; process the packet according to information in the FSE; and modify the iteration value. Other aspects and/or advantages of the present invention are described herein.

BRIEF DESCRIPTION OF THE DRAWINGS

Non-limiting examples of embodiments of the disclosure are described below with reference to figures attached hereto that are listed following this paragraph. Identical features that appear in more than one figure are generally labeled with a same label in all the figures in which they appear. A label labeling an icon representing a given feature of an embodiment of the disclosure in a figure may be used to reference the given feature. Dimensions of features shown in the figures are chosen for convenience and clarity of presentation and are not necessarily shown to scale. For example, the dimensions of some of the elements may be exaggerated relative to other elements for clarity, or several physical components may be included in one functional block or element. Further, where considered appropriate, reference numerals may be repeated among the figures to indicate corresponding or analogous elements.

The subject matter regarded as the invention is particularly pointed out and distinctly claimed in the concluding portion of the specification. The invention, however, both as to organization and method of operation, together with objects, features and advantages thereof, may best be understood by reference to the following detailed description when read with the accompanied drawings. Some embodiments of the invention are illustrated by way of example and not of limitation in the figures of the accompanying drawings, in which like reference numerals indicate corresponding, analogous or similar elements, and in which:

DETAILED DESCRIPTION OF THE INVENTION

In the following detailed description, numerous specific details are set forth in order to provide a thorough understanding of the invention. However, it will be understood by those skilled in the art that the present invention may be practiced without these specific details. In other instances, well-known methods, procedures, and components, modules, units and/or circuits have not been described in detail so as not to obscure the invention. Some features or elements described with respect to one embodiment may be combined with features or elements described with respect to other embodiments. For the sake of clarity, discussion of same or similar features or elements may not be repeated.

Although some embodiments of the invention are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulates and/or transforms data represented as physical (e.g., electronic) quantities within the computer's registers and/or memories into other data similarly represented as physical quantities within the computer's registers and/or memories or other information non-transitory storage medium that may store instructions to perform operations and/or processes. Although embodiments of the invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. The term set when used herein may include one or more items.

Unless explicitly stated, the method embodiments described herein are not constrained to a particular order in time or to a chronological sequence. Additionally, some of the described method elements can occur, or be performed, simultaneously, at the same point in time, or concurrently. Some of the described method elements may be skipped, or they may be repeated, during a sequence of operations of a method.

Figure 1A:
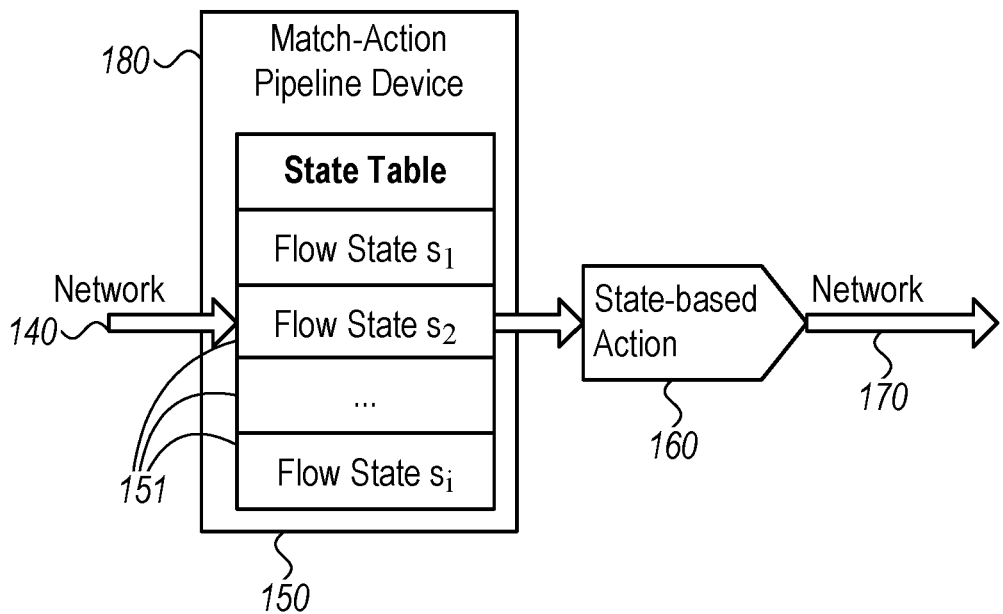
FIG. 1A is an overview of a prior art system.

Reference is made to FIG. 1A, which shows a prior art computing device 180. As shown, packets may enter computing device 180 from network 140 and a state table 150 in computing device 180 may be used for finding the state of the relevant flow. For example, each entry or row 151 in table 150 may correspond to a flow, e.g., an entry 151 may include data that describes the state, condition or any relevant aspects of the corresponding flow. Generally, packets entering computing device 180 are classified and/or matched to a certain flow (the 'Match' phase). Examples of such matching functions are a direct-match function, where a key calculated based on the header and content of an entering packet serves as an index to state-table 150, in some cases, a hash function applied to the key serves as a pointer to an entry or row in state-table 150 (e.g., an entry or row 151). Flows' states are described, included or encoded in entries or rows 151 in state-table 150 (also referred to in the art as a lookup table), where each entry 151 corresponds to a certain flow. Of course, the number of flows a device or system can handle simultaneously is limited by the number of entries 151 in table 150. Entries or rows in state-table, e.g., entries or rows 151 in table 150, may be referred to herein as flow state entries (FSEs). An FSE generally includes any data and/or metadata required by a PPD (e.g., by a stage in the PPD) in order to process a packet.

As shown by block 160, packets are subjected to a packet processing logic according to their content and the state of the corresponding flow ('Action' phase). That is, the state of the relevant flow may be determined based on information in an FSE in state-table 140, and the processing at block 160 is done according to the state as recorded in the FSE. Processed packets (e.g., modified packets) may be sent out to network 170 as shown.

Figure 1B:
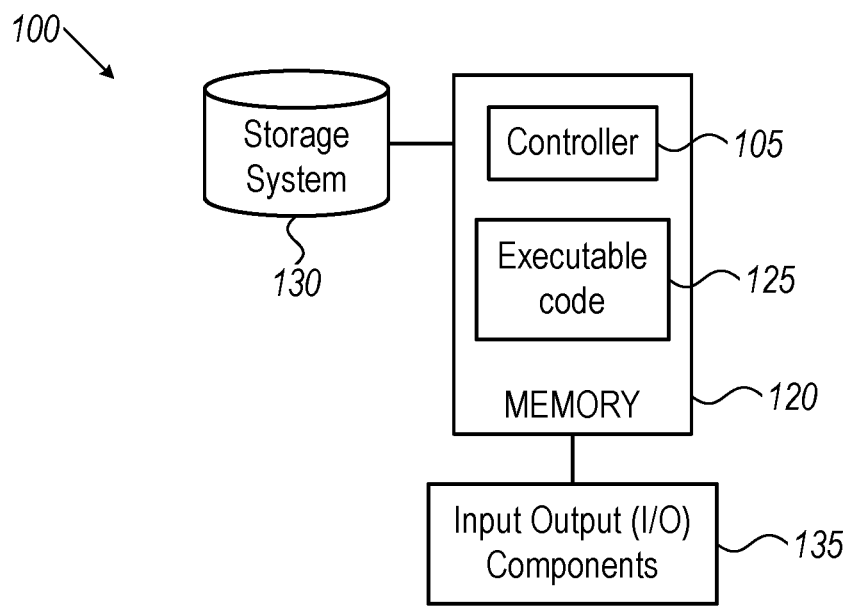
FIG. 1B shows a block diagram of a computing device according to illustrative embodiments of the present invention.

Reference is made to FIG. 1B, showing a non-limiting, block diagram of a computing device or system 100 that may be used to control operation of a computer network device according to some embodiments of the present invention. Computing device 100 may include a controller 105 that may be, or may include, a hardware controller. For example, computer hardware processor or hardware controller 105 may be, or may include, a central processing unit processor (CPU), an ASIC, a chip or any suitable computing or computational device. Computing system 100 may include a memory 120, executable code 125, a storage system 130 and input/output (I/O) components 135. Controller 105 (or one or more controllers or processors, possibly across multiple units or devices) may be configured (e.g., by executing software or code) to carry out methods described herein, and/or to execute or act as the various modules, units, etc., for example by executing software or by using dedicated circuitry. More than one computing devices 100 may be included in, and one or more computing devices 100 may be, or act as the components of, a system according to some embodiments of the invention. For example, a plurality of stages in a PPD may each include components of computing device 100 and may act as the components of a system according to some embodiments of the invention.

Memory 120 may be a hardware memory. For example, memory 120 may be, or may include, machine-readable media for storing software, e.g., a Random-Access Memory (RAM), a read only memory (ROM), a memory chip, a Flash memory, a volatile and/or non-volatile memory or other suitable memory units or storage units. Memory 120 may be or may include a plurality of, possibly different, memory units. Memory 120 may be a computer or processor non-transitory readable medium, or a computer non-transitory storage medium, e.g., a RAM. Some embodiments may include a non-transitory storage medium having stored thereon instructions which, when executed, cause the processor to carry out methods disclosed herein.

Executable code 125 may be an application, a program, a process, task or script. A program, application or software as referred to herein may be any type of instructions, e.g., firmware, middleware, microcode, hardware description language etc. that, when executed by one or more hardware processors or controllers 105, cause a processing system or device (e.g., system 100) to perform the various functions described herein.

Executable code 125 may be executed by controller 105 possibly under control of an operating system. For example, executable code 125 may be an application that, using graphical means, receives input from a user and configures a network device according to the input as further described herein. Although, for the sake of clarity, a single item of executable code 125 is shown in FIG. 1, a system according to some embodiments of the invention may include a plurality of executable code segments similar to executable code 125 that may be loaded into memory 120 and cause controller 105 to carry out methods described herein. For example, units or modules described herein, e.g., management unit 210 further described herein, may be, or may include, controller 105, memory 120 and executable code 125.

Storage system 130 may be, or may include, for example, a hard disk drive, a universal serial bus (USB) device or other suitable removable and/or fixed storage unit. Content may be loaded from storage system 130 into memory 120 where it may be processed by controller 105. For example, functional block data and configuration data may be loaded into memory 120 and used for configuring and operating a network device as further described herein.

In some embodiments, some of the components shown in FIG. 1 may be omitted. For example, e.g., in a stage unit of a PPD, memory 120 may be a non-volatile memory having the required storage capacity and thus a storage system 130 may not be required.

I/O components 135 may be, may be used for connecting (e.g., via included ports) or may include: a mouse; a keyboard; a touch screen or pad or any suitable input device. I/O components 135 may include one or more screens, touchscreens, displays or monitors, speakers and/or any other suitable output devices. Any applicable I/O components may be connected to computing device 100 as shown by I/O components 135, for example, a wired or wireless network interface card (NIC), a universal serial bus (USB) device, a wire directly connecting computing device 100 to a network device, or an external hard drive may be included in I/O components 135.

A system according to some embodiments of the invention may include components such as, but not limited to, a plurality of central processing units (CPU) or any other suitable multi-purpose or specific processors, controllers, microprocessors, microcontrollers, FPGAs, PLDs, SOCs or ASICs. A system according to some embodiments of the invention may include a plurality of input units, a plurality of output units, a plurality of memory units, and a plurality of storage units. A system may additionally include other suitable hardware components and/or software components. In some embodiments, a system may include, for example, a desktop computer, a workstation, a server computer, a network device, or any other suitable computing device.

Some embodiments of the invention enable implementing or supporting applications of larger complexity. Moreover, some embodiments of the invention enable integrating multiple match-and-action applications, services or flows for a single packet, in a single device. Yet another advantage provided by some embodiments relates to a processing order of stages in a pipeline. For example, some embodiments may enable processing a packet using a non-sequential or non-serial processing order of stages in a pipeline.

Figure 2:
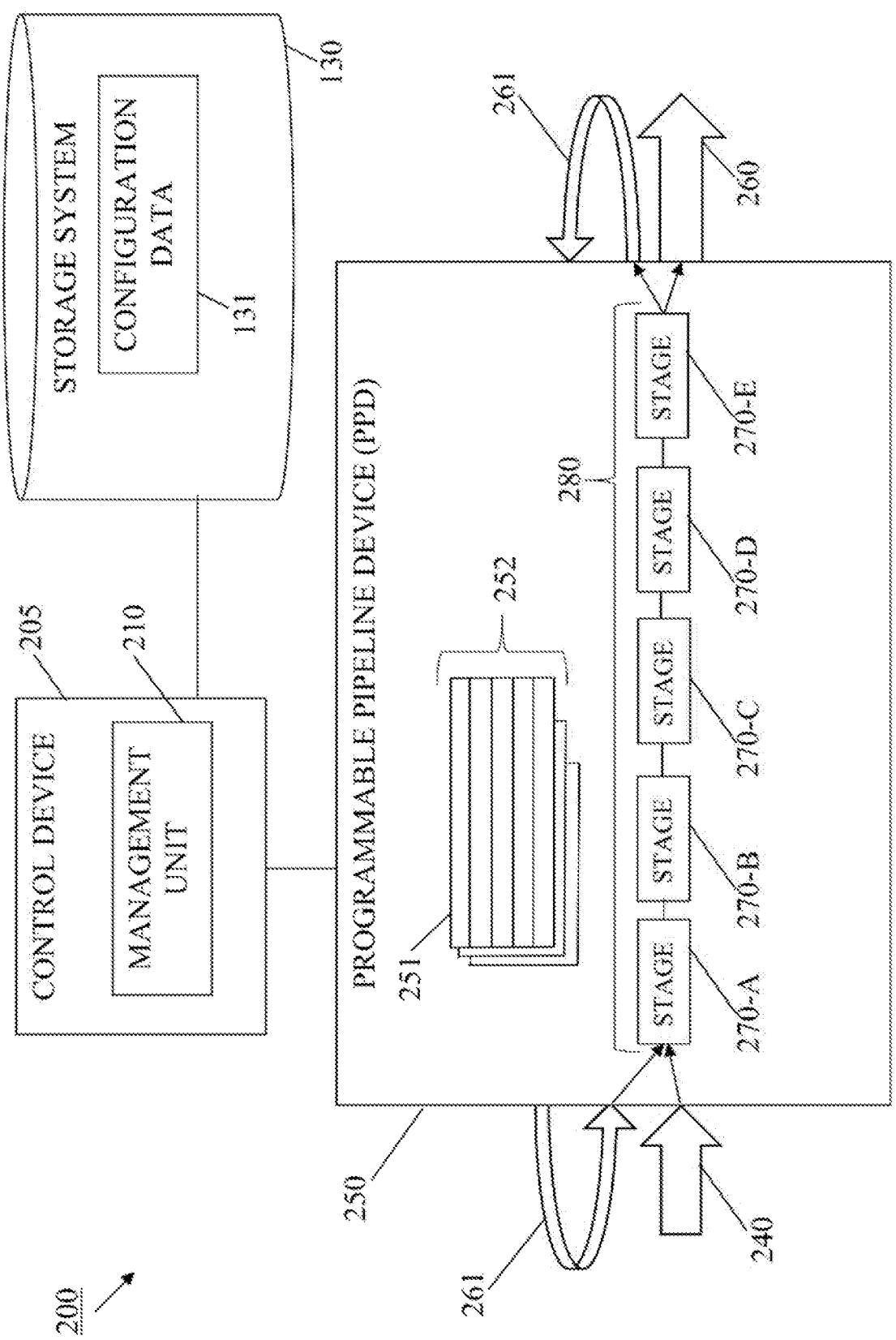
FIG. 2 shows a system according to some embodiments of the present invention.

Reference is made to FIG. 2, which shows an overview of a system 200 according to some embodiments of the present invention. As shown, a system 200 may include a control device 205 that may include a management unit (MU) 210. Control device 205 and MU 210 may be, or may include components of, computing device 100. For example, MU 210 may include a controller 105, a memory 120 and one or more executable code 125 segments or objects.

As further shown, control device 205 may be connected to a storage system 130 that may include configuration data 131. Data objects in storage system 130, e.g., configuration data 131, may be any suitable digital data structure or construct or computer data objects that enable storing, retrieving and modifying data and information. For example, configuration data 131 may be, or may include, files, tables, or lists in a database in storage system 130.

Data may be loaded from storage system 130 into memory 120 where it may be processed by controller 105. For example, some of configuration data 131 may be loaded into memory 120 and used for configuring, and/or controlling operation of, PPD 250 as further described herein. Although not shown, control device 205 may be connected to, and control or configure, any (possibly large) number of PPDs 250.

As shown, system 200 may include a PPD 250 that may include a set of tables 251, each including a set of entries 252. As further shown, PPD 250 may include a set or plurality of stages 270-A through 270-E forming or constituting pipeline 280.

As shown, at least one input 240 and at least one output 260 may be connected to PPD 250, for example, input 240 and output 260 may be network cables and/or ports or they may be or include wireless components. Input 240 may enable PPD 250 to receive input, e.g., in the form of network messages, data packets or data segments and output 260 may enable PPD 250 to provide output, e.g., in the form of network messages, packets or segments sent to a network.

It will be noted that, typically, input 240 may include a number of input lines or pins enabling PPD 250 to receive input from a plurality of input sources, and that, similarly, more than one output line or channel may be included in output 260, thus enabling PPD 250 to selectively send or provide output over one or more lines, cables, pins etc.

As shown, PPD 250 may include one or more tables 251, e.g., tables 251 may be state-tables as described herein. Tables 251 may be collectively referred to hereinafter as tables 251 or individually as a table 251, merely for simplicity purposes. Tables 251 may be state tables (or state-tables), as used herein, the terms "table 251", "state tables 251" and "state-tables 251" mean the same thing and may be used interchangeably.

In some embodiments, tables 251 are created during production of PPD 250 (e.g., included in an image as known in the art), and in other embodiments, tables 250 may be loaded into a memory of PPD 250 during initialization-time.

State-tables 251 may be, or may include, computer hardware, and, for example, a state-table 251 may be a part or component of/in an ASIC. Tables 251 may be created, filled or populated with values by control device 205. For example, controller 205 may create a table 251 and download the table to PPD 250, or control device 205 may create table 251 by directly accessing a memory in PPD 250, or control device 205 may command PPD 250 to create and fill a state-table 251, e.g., based on configuration data 131 that may include any or all information required in order to configure PPD 250. Control device 205 may create and/or update state-tables 251 using systems and/or methods for programming programmable devices as known in the art.

PPD 250 may be, or may include components of, computing device 100. For example, PPD 250 (e.g., each stages 270-A and 270-C) may include a memory 120 and a controller 105, and executable code 125 may cause controller 105 to extract or obtain, from a packet, values or content in specific header fields, portions of content in the packet, e.g., in specific offsets in the packet's payload, attributes and/or metadata of the packet. Executable code 125 may cause the controller 105 to apply a mapping function to extracted data (and/or to a key constructed based on extracted data), produce, using the mapping function, an identification of, or reference to, an entry in at least one of table 251. For example, controllers 105 in each of stages 270-A, 270-B and 270-D in PPD 250 may each calculate a key based on data extracted from packets, messages or frames and use to key to find (match) an FSE. Based on an FSE found as described, controllers 105 in each of stages 270-A, 270-B and 270-D in PPD 250 may further perform an action.

As shown, a loopback connection, path, line or route 261 may connect an output, output port or egress of PPD 250 to an input or ingress port of PPD 250. For the sake of clarity, loopback 261 is shown in FIG. 2 as an external component; however, in some embodiments, loopback 261 may be internal to PPD 250, e.g., loopback 261 may be an internal bus connecting stage 270-E to/with stage 270-A, e.g., such that a packet is provided to an ingress of PPD 250 without passing through ingress port 240. For example, as further described herein, based on an iteration (cycle or loop) value provided or associated with, or included in a packet received from stage 270-D, stage 270-E may select to send the packet over loopback 261 such that the packet is received by stage 270-A.

In some embodiments, a packet entering PPD 250 travels, or passes all stages in pipeline 280, e.g., the packet is received by stage 270-A that may select whether or not to process the packet and may then forward to packet to stage 270-B that may select whether or not to process the packet and may then forward to packet to stage 270-C and so on, and stage 270-E may select whether or not to process the packet and may then forward to packet to loopback 261 (that is, back to stage 270-A) and/or to output 260 (e.g., to another node in a network).

As described, a stage in pipeline 280 may select whether or not to process a packet. For example, logic or rules in each stage, e.g., executed by a controller 105 in the stage according to executable code 125, may cause a stage to examine header values of a packet and decide based on the values whether or not to process the packet, for example, based on header of a packet, a stage may identify a protocol, source/destination and the like and may process packets of only a specific protocol, specific source and so on. In some embodiments, a stage may select whether or not to process a packet by calculating, constructing, generating a key (or key value) based on portions or headers of a packet and checking whether or not the key (or key value) points to a valid or existing entry 252 in a table 251. If no valid entry can be found, the stage may avoid processing a packet and may forward the packet without processing it (untouched) to the next stage, or, in the case of stage 270-E, to one of output 260 or loopback 261.

In some embodiments, if stage in pipeline 280 decides or selects to process a packet, then the stage may modify the packet to create a modified or transformed packet, may create or generate metadata for the packet, and may forward the modified packet and/or the metadata to the next stage in pipeline 280. Accordingly, an outcome of an action of a stage can be encoded and made available all subsequent stages, e.g., since a (possibly modified) packet and its metadata are forwarded by/to stages down pipeline 280, metadata generated and added to a packet by stage 270-C may be available to stages 270-D and 270-E.

As described, a flow to which a packet belongs may be identified using a key (matching key) calculated by applying a mapping function to a specific set of the packet's headers, content or fields. As further described, in some embodiments, possibly in addition to the packet's headers and content, a key may be calculated based on metadata included in, or associated or provided with a packet. For example, an iteration value may be included in metadata that may be associated with a packet and when may be forwarded or provided with the packet, e.g., from one stage in pipeline 280 to the next stage.

For example, a key or key value generated or produced by a mapping function is used as a pointer or reference to an entry (or FSE) 252 in one of tables 251 where the entry or FSE describes the state of the identified flow. In some embodiments, a mapping function may produce a predefined key or key value that indicates no entry exists, or, in other cases or embodiments, a key value, when used to access an entry 252 in a table 251 may return a predefined value that indicates the key value does not match any entry in the table 251.

To illustrate, starting with a mapping function that maps a packet $P_i$ at stage K by calculating a key $Key_{jk}$ by applying a mapping function Map to a set of fields $f_{i1}, f_{i2}, \ldots f_{ij}$ as shown by formula A:

$$Key_{ik}=Key(P_i)=Map_k(f_{i1k}, f_{i2k}, \ldots f_{ijk})$$ Formula A

A corresponding state $State_{ik}$ may be retrieved by accessing a matching entry in the state table $T_{sk}$, by applying a matching function Match to $Key_{jk}$ as shown by formula B:

$$State_{ik}=T_{sk}[Match_k(T_{sk},Key_{ik})]$$ Formula B

Accordingly, when a PPD receives an incoming packet, a specific one, and only one, FSE (state of the relevant flow) may be found, retrieved or obtained by a stage in pipeline 280. More specifically, a stage may find no entries (or FSEs) that match a packet or it may find one, single, matching FSE or entry 252 in a table 251.

Some embodiments of the invention use a mapping function $F_m$ that maps a packet to a key based on a set of fields, e.g., as described and, addition, based on an iteration (cycle or loop) value. For example, in some embodiments, metadata created or modified for, and associated and/or forwarded with a packet includes an iteration value or number.

For example, starting with a mapping function shown by formula C:

$$F(p_i)=\text{Hash}(5\text{tuple}(p_i),s)$$ Formula C

Where "Hash" is some hash function, e.g., as known in the art, 5tuple is a set of five values in header fields of a TCP packet or frame and "s" is the range or size of a table, some embodiments may use a mapping function as shown by formula D:

$$F_m(p_i)=\text{Hash}(5\text{tuple}(p_i),s)+f_m$$ Formula D

Where $f_m$ may be an offset calculated based on the value of the field $f_m$. That is, $f_m$ may be viewed as a per-service/application offset. Assuming each iteration defines or is related to a separate, different service or application, $f_m$ may be defined or set based on the iteration value. Specifically, domains mapped to by $F_m(p_i)$ may be non-overlapping. Generally, non-overlapping domains may mean, or may relate to, sets of values which are unique to respective sets of domains, that is, a value which is included in a first domain is not included in a second domain if the first and second domains are non-overlapping. Otherwise described, non-overlapping domains do not include common or same values.

For example, when a packet first enters PPD 250 from input 240, stage 270-A may set an iteration field in metadata to zero ("0") before (possibly processing and) forwarding the packet through pipeline 280 (e.g., forwarding the packet to stage 270-B). If selecting to send a packet over, to or through, loopback 261, stage 270-E may increase the iteration value in the metadata before looping, sending or forwarding the packet back to stage 270-A.

Consequently, an iteration value that reflects the number of times a packet may be looped through pipeline 280 may be visible or available to stages in pipeline 280. Using a mapping function that takes into account, or is aware of, an iteration value as described, a stage in pipeline 280 may map a packet to a first entry 252 in a table 251 during a first iteration and map the packet to a second, different entry 252 in a (possibly different) table 251 during a second iteration or loop.

For example, a first key may be constructed for a packet when the iteration value in its metadata is five or less and a second, different key may be constructed, for the same packet, when the iteration value in its metadata is greater than five.

Determining, by at least some of the stages in pipeline 280, whether or not to process a packet based on an iteration value, and further mapping or matching a packet to/with an FSE (or state entry) based on the iteration value enable embodiments to increase the complexity of services or applications provided or supported by pipeline 280.

For example, for processing a given input packet, a current or known PPD can only use each of the stages once. In contrast, PPD 250 may use stages 270-A, 270-B and 270-C in a first iteration or loop and use stages 270-B and 270-D in a second, subsequent iteration or loop, and thus, stage 270-B may be used twice for the same packet. To further clarify, when a stage is not used (e.g. 270-C in the second iteration in the example above), it means that the packet doesn't undergo any processing (alteration, constructing new metadata etc.) in the stage.

Moreover, the order by which stages are used by a current or known PPD cannot be altered. For example, when processing a packet, a PPD cannot use the third stage before the first stage in a pipeline. In contrast, PPD 250 can use stages 270-A and 270-C in a first loop and can use stages 270-B and 270-E in a second loop, thus, although stage 270-B is before, or preceding stage 270-C, PPD 250 can use it, on a packet, after stage 270-C was used.

Accordingly, in some embodiments, the number of times that a stage in a pipeline can process, or act on, a packet may be unlimited. Moreover, in some embodiments the order by which stages in a pipeline process, or act on, a packet may be different from the physical order of the stages in the pipeline.

In some embodiments a table 251 may be divided into, or treated as, a set of logical state tables, and an iteration value may be used, by stages in pipeline 280, to select or match one of the set of logical set tables for/with a packet. For example, the iteration value may be used as an offset in a table 251, such that a first iteration value points to a first logical state table in a table 251, and a second iteration value points to a second, different logical state table in the same table 251.

A logical state table as referred to herein may be a portion of a physical table in PPD 250. For example, a physical segment in memory 120 may be viewed, treated and used as two or more logical tables, e.g., a first logical table may occupy a first portion of the physical memory, and a second logical table may occupy a second, different portion of the same physical memory. In some embodiments, a first one of the logical tables includes FSEs in, or according to, a first format, and a second logical table includes FSEs in or according to a second, different format.

Accordingly, logical tables enable mapping non-overlapping domains for different applications/iterations in the same physical memory, that is, a first service may be mapped to a first logical table and a second service or application may be mapped to a second, different logical table.

Figure 3:
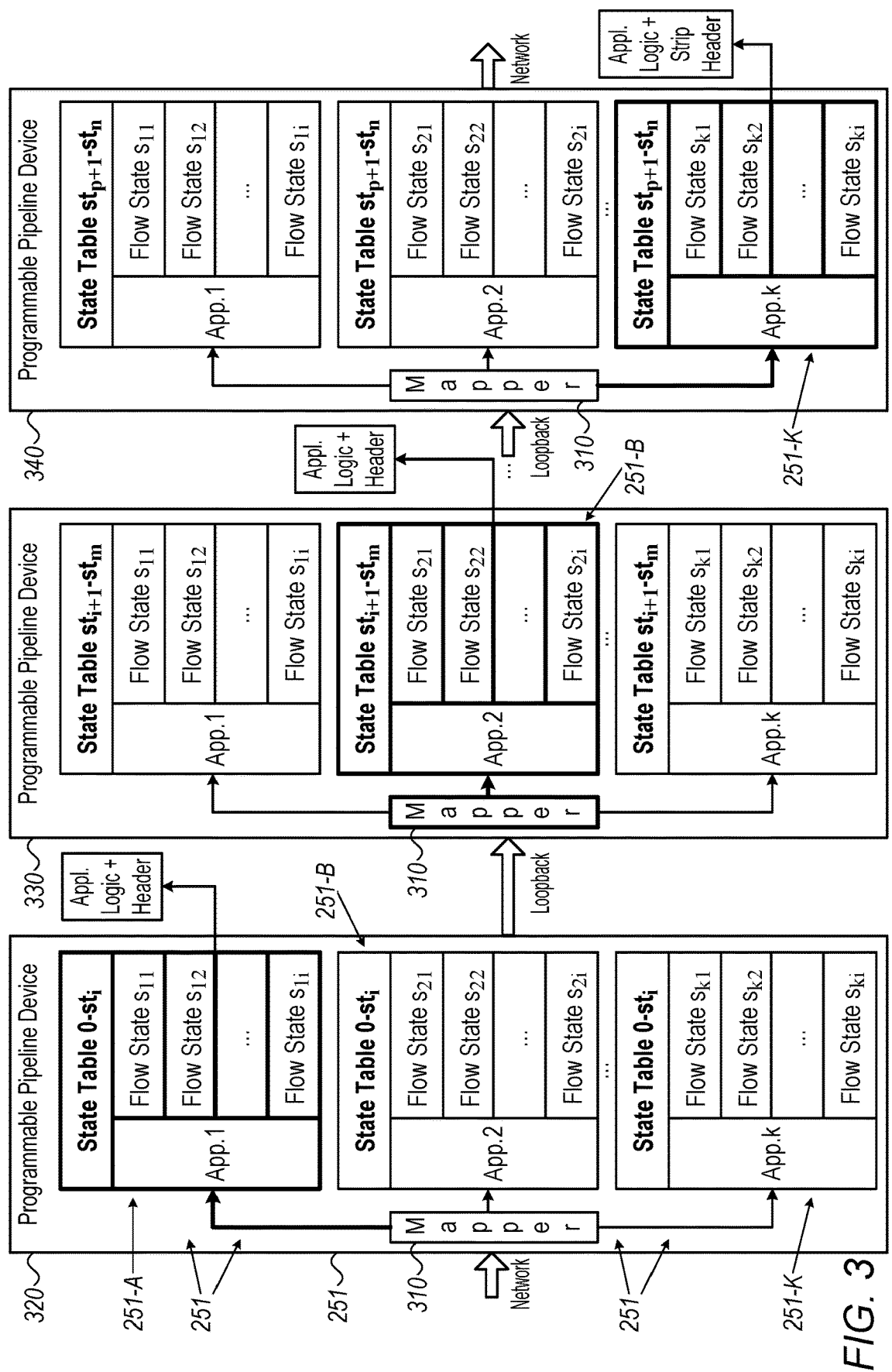
FIG. 3 illustrates mapping a packet to logical state tables according to some embodiments of the present invention.

Reference is made to FIG. 3, which illustrates mapping a packet to logical state tables. As shown, a state table 251 may be divided into a set of logical state tables 251-A, 251-B and so on, up to 251-K. As illustrated by block 320, in a first iteration (e.g., an initial or first iteration performed for an incoming packet), a mapper unit 310 in a stage in pipeline 280 may map the packet to logical state table 251-A in table 251 (e.g., based on an iteration value of zero ("0")).

It will be noted that any number or subset (or even all of the) of the stages in pipeline 280 may, during a first or same iteration, map the packet to logical state table 251-A, e.g., by constructing a key that points to an entry 252 in logical state table 251-A. Any number or subset (or even all of the) of the stages in pipeline 280 may, during the first or same iteration and based on data in an entry 252 in logical state table 251-A, process the packet.

Following a first iteration, cycle or loop, the iteration value in metadata of the packet may be increased and the packet may be looped back to the ingress of PPD 250. As shown by block 330, in a second iteration, based on the now increased iteration value, mapper unit 310 may map the packet to logical state table 251-B where another, different entry 252 may be found and used as described. Similarly, at cycle K, mapper unit 310 may map the packet to logical state table 251-K, where yet another entry 252 may be found and used as described.

It will be understood that the same or first logical table may be used for a set or range of iteration values. For example, to provide a first service for, or with respect to, a packet, PPD 250 may loop the packet three times as described and the same logical table (e.g., 251-A) may be used in the three loops or cycles, next, to provide a second service for the same packet, PPD 250 may loop the packet twice using logical state table 251-B. Similarly, a third service or application may be provided or executed for the packet as shown by block 340 where logical state table 251-K is used. Accordingly, the number of services or applications that can be provided or executed, for a packet, may be unlimited and increased as compared to a single service that can be provided, per packet, by current or known systems and methods.

Some embodiments of the invention enable dynamically and automatically selecting a processing order of stages in a pipeline. For example, some embodiments enable processing a packet using a non-sequential or non-serial processing order of stages in a pipeline. For example, PPD 250 may, during a first iteration or loop, process a packet using stages 270-A, 270-B and 270-E and, during a second loop or iteration, process the packet by, or using, stage 270-D, and further use just stage 270-C in a third loop, thus actually processing the packet according the order of 270-A, 270-B, 270-E, 270-D and 270-C which is different than the physical order of stages in pipeline 280. When processing a packet, an embodiment may use a stage more than once. For example, PPD 250 may perform or apply the sequence of 270-A, 270-B, 270-E and 270-B, e.g., use stages 270-A, 270-B, 270-E in a first iteration and use stage 270-B in a subsequent iteration.

Figure 4A:
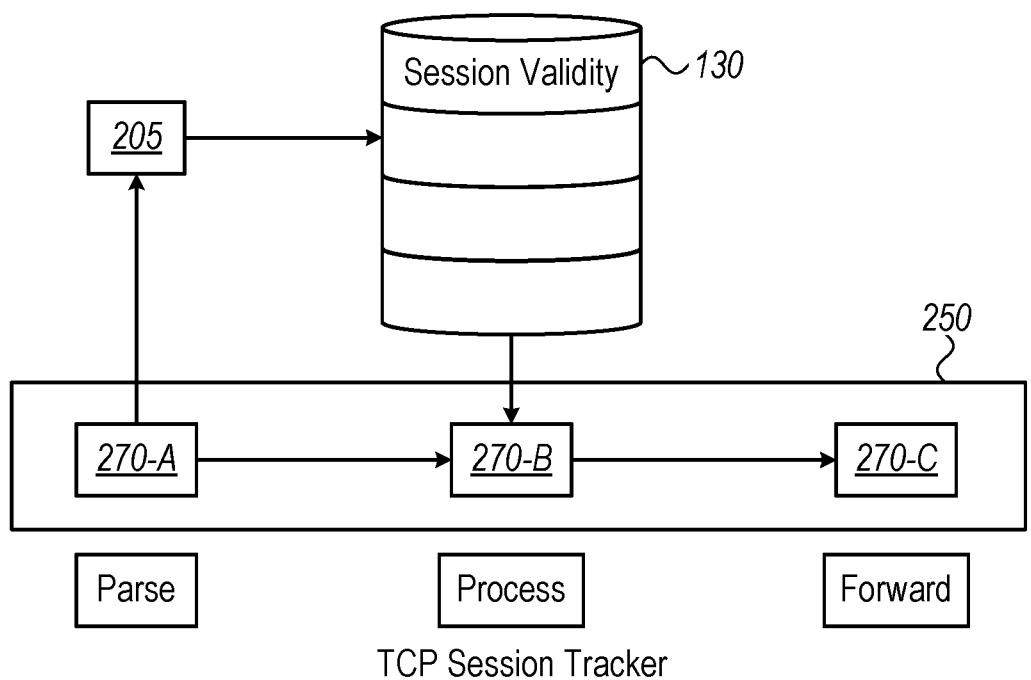
FIG. 4A shows a system and flow according to some embodiments of the present invention.
Figure 4B:
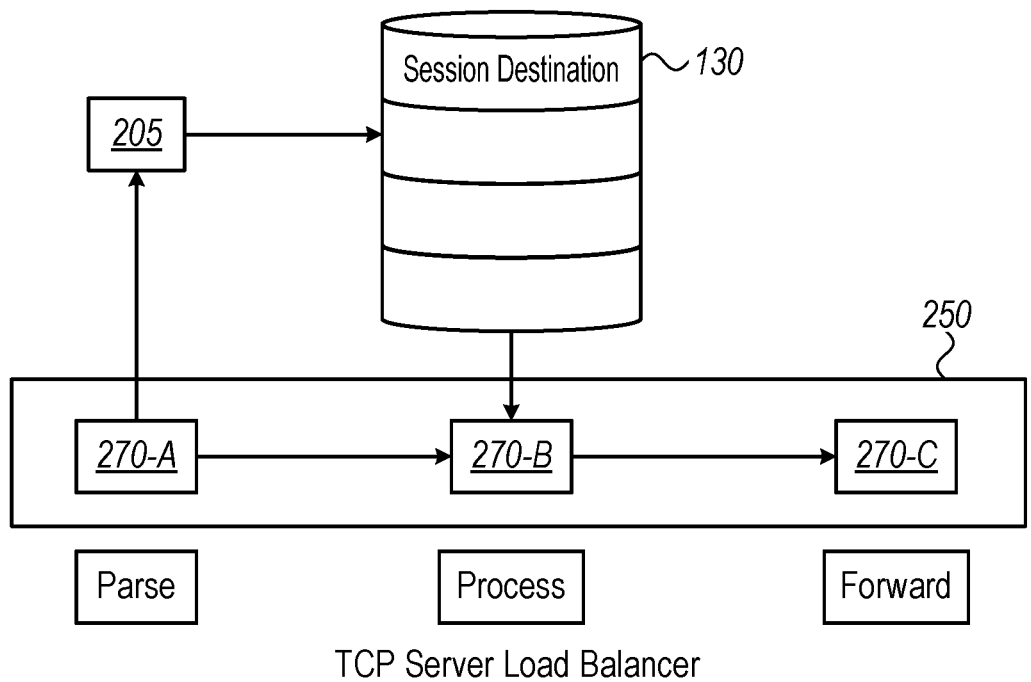
FIG. 4B shows a system and flow according to some embodiments of the present invention.
Figures 4C, 5:
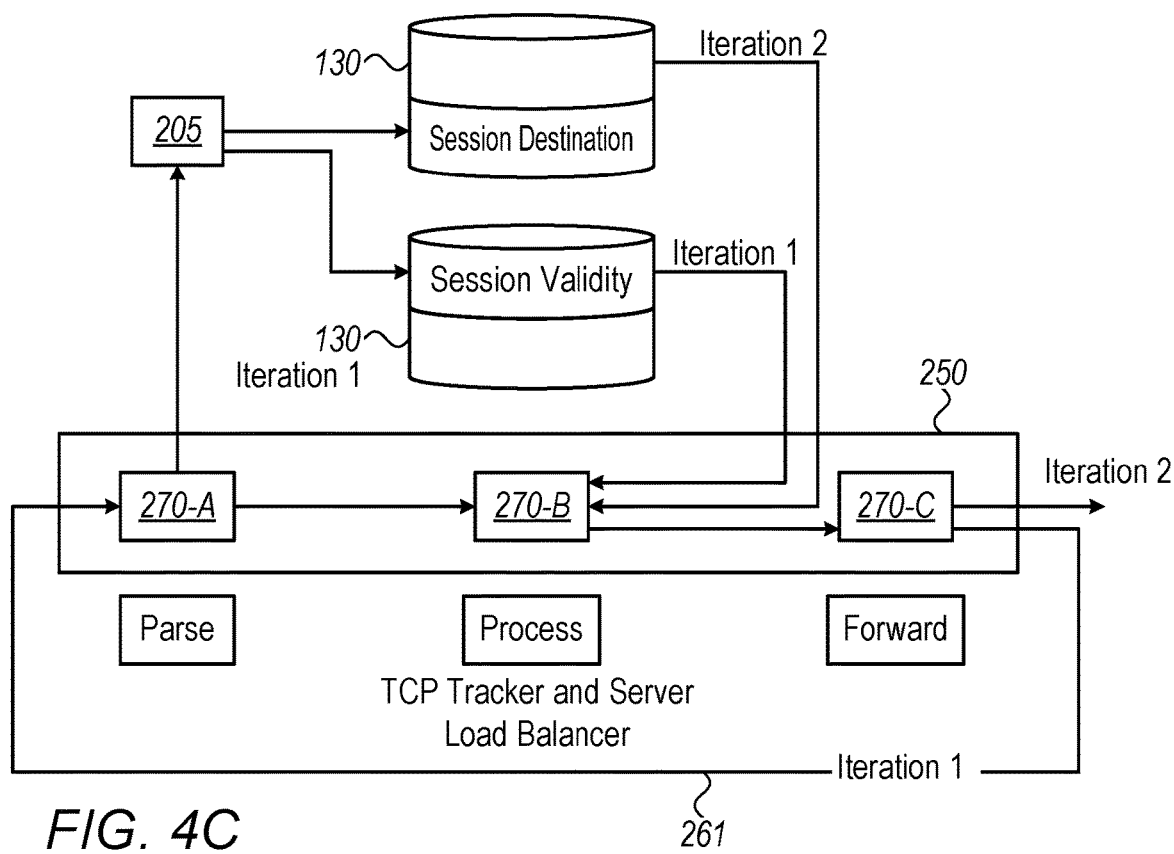
FIG. 4C shows a system and flow according to some embodiments of the present invention.
FIG. 5 shows a flowchart of a method according to illustrative embodiments of the present invention.

To illustrate how, in some embodiments, a single PPD can support, handle, provide or execute two applications, reference is made to FIG. 4A, FIG. 4B and FIG. 4C, which show components of systems and flows according to some embodiments of the present invention. For example, the two applications may be a 1) a TCP session validity application (or tracker) and a 2) a server load balancer application.

Generally, the TCP session validity application tracks flows defined as, or based on, TCP sessions. Each flow may be identified by the following fields of a packet: Source-IP, Destination-IP, Source-Port, Destination-Port, Protocol. For each packet, the TCP session validity application identifies whether the packet is a TCP control packet. If so, the packet may be mirror-copied (provided) to control device 205 for processing. Control device 205 may determine whether or not the corresponding session is in a valid state, and, control device 205 may update the corresponding state table 251 in PPD 250. All packets associated with a valid session (or session state) may be forwarded. All packets associated with an invalid session or state, or not associated with any session, may be dropped.

As illustrated in FIGS. 4A, 4B and 4C, in some embodiments, a PPD 250 may include three stages 270-A, 270-B and 270-C. As shown in FIG. 4A, in order to execute the TCP session validity application, stage 270-A may perform packet parsing and may send relevant packets to control device 205. Control device 205 may update a session-validity table that may be stored in storage 130 and may further be stored and/or dynamically updated in a memory of stage 270-B. Stage 270-B may decide whether to drop or to forward the packet according to the validity of the corresponding session, reflected, indicated or described, in an FSE in a session-validity table as described. Stage 270-C may perform forwarding based on packet destination.

Remaining with the three-stages PPD example, FIG. 4B illustrates executing the server load balancer application that may identify a packet's flow based on the following fields of a packet: Source-IP, Destination-IP, Source-Port, Destination-Port, Protocol. The server load balancer application may check whether or not a packet is a TCP packet, and whether or not its destination IP address is a designated (e.g., in a table 251 updated by control device 205) Virtual IP (VIP). The server load balancer application may map the packet to one of a set of Server IP addresses in a consistent manner, e.g., so that all packets of, or belonging to, the same flow (mapped to the same FSE) are mapped (and sent) to the same server IP address. For example, the processing done by stage 270-B in FIG. 4B may include mapping a packet to one of a set of server IP addresses based on a session destination table 251 as illustrated. The server load balancer application may further maintain a per-flow table that can override the initial decision and send a packet to a different destination-IP.

Accordingly, stage 270-C in PPD 250 needs to execute a first logic and/or a set of operations using a first set of tables (e.g., a session validity table) in order to execute, support or provide the TCP session validity application, and stage 270-C in PPD 250 needs to execute a second, different logic and/or a set of operations using a second, different set of tables (e.g., a session destination table) in order to execute, support or provide the server load balancer application.

However, since a (e.g., match-and-action) stage can perform a single lookup per packet, a stage can address only one attribute of a packet reflected in a corresponding FSE of a table. Therefore, a prior art PPD cannot provide, support or execute, for a single incoming packet, both the TCP session validity application and the server load balancer application.

FIG. 4C illustrates providing, by a PPD and for an incoming packet, a first application and providing, by the PPD and for the same incoming packet, a second, different application. For example, in a first iteration (e.g., when an iteration value in metadata of an incoming packet is zero ("0"), stage 270-B may perform session tracking for the TCP session validity application (using a session validity table) as described, and if the session is invalid, stage 270-B may drop the packet. Otherwise, that is, if the session is valid, the packet may be looped back over loopback 261, and, during the second pass of the packet through PPD 250, stage 270-B may select a destination IP address such that the server load balancer application is executed as described. Accordingly, two different applications (or services) may be provided by an embodiment for a single or same incoming packet.

FIG. 5 which shows a flowchart of a method according to illustrative embodiments of the present invention. As shown by block 510, a mapping function produces, based on a set of attributes of a packet and based on an iteration value, a location of an FSE in a state-table may be defined. For example, a mapping function may be defined as described with reference to formulas A, B, C and D. As shown by step 515, the mapping-function may be applied to an incoming packet and an iteration value and, the incoming packet may be processed according to an FSE in a location returned by the mapping function. As shown by step 520, an iteration value may be modified. For example, an iteration value may be incremented by a stage in pipeline 280 as described, e.g., prior to looping a packet back to the begging of pipeline 280. As shown by step 525, the steps of applying the mapping function (step 515) and modifying an iteration value (step 520) may be repeated. For example, as described, as a packet loops through pipeline 280, the iteration value is incremented such that different FSEs are pointed (or mapped) to in different loops.

In some embodiments, a method of processing a packet may include defining a mapping-function that produces, based on a set of attributes of a packet and based on an iteration value, a location (or a pointer or reference to a location) of an FSE in a state-table. For example, using $F_m$ in formula C as a mapping function, with $f_m$ representing the iteration value, stages in pipeline 280 may identify or locate an FSE for a packet.

Some embodiments of the invention may apply the mapping-function to an incoming packet and may process the packet according to data in the FSE found at the location produced by the mapping function. For example, stages in pipeline 280 may apply or use Fm as described and use the output of Fm to retrieve an FSE from a table 251.

Some embodiments of the invention may modify the iteration value. For example, stage 270-E may increment an iteration value in metadata of a packet and send the packet with the incremented iteration value (e.g., as attached metadata) to loopback 261. Some embodiments may repeat the steps of applying a mapping function to a packet, processing the packet and incrementing the associated iteration value. For example, after a packet was processed by some or even all stages in pipeline 280 (where the processing includes applying a mapping function as described), stage 270-E may increment an iteration value associated with the packet and may send the packet back to stage 270-A, thus causing the cycle of processing and incrementing an iteration value of a packet to be repeated.

It will be noted that, although metadata including an iteration value and forward or carried with a packet from stage to stage is mainly described herein, any method of associating, including or attaching an iteration value to a packet may be used by some embodiments of the invention. For example, padding bits in the IP header or reserved bits in a TCP header may be used for storing an iteration value or counter.

In some embodiments, a first service, application or flow may be provided, supported or handled if or when an iteration value associated provided or forwarded with a packet is smaller than a threshold value, and a second service, application or flow may be provided, supported or handled if or when the iteration value is greater or larger than the threshold value.

For example, a mapping function that takes into account the iteration value of a packet may cause stages in pipeline 280 to access an FSE in table 251-A if the iteration value is five or less, and the mapping function may further cause stages in pipeline 280 to access an FSE in table 251-B if the iteration value greater than five.

Generally, different flows, services or applications require different FSEs, for example, an FSE for a service related to security may include information that is different from the information in an FSE for a load balancing service. The ability of some embodiments to use more than one FSE for a packet enables some embodiments of the invention to provide, for a given packet, more than one service. Specifically, as described, a set of FSEs for a respective set of services, flows or applications may be stored in a respective set of logical state tables. For example, in order to provide a first service with respect to a packet, e.g., if the iteration value is less than two, stages in pipeline 280 may access a first FES in a first logical table (e.g., logical table 251-A), and, in order to provide a second service for the same packet, stages in pipeline 280 may access a second FES in a second logical table (e.g., logical table 251-B), and so on.

It will be noted that the logic (e.g., as encoded in executable code 125) in stages of pipeline 280 may be such that it causes the stages to act according to data in an FSE. Otherwise described, a stage in pipeline 280 knows (or is adapted to identify or determine) what service is currently provided or handled based on data in an FSE, and/or a stage knows what it needs to do (what logic or processing it needs to execute) based on data in an FSE. Accordingly, by pointing stages to different (e.g., first and second) FSEs based different (e.g., first and second) iteration values, some embodiments of the invention enable increasing the number of services, applications or flows that a device or system can handle per packet. For example, as described with reference to FIG. 4C, stage 270-B may be pointed to a first table in a first iteration or passage of a packet through pipeline 280, and stage 270-B may be pointed to a second, different table in a second or subsequent iteration or passage of the packet through pipeline 280.

In some embodiments, the threshold value is a programmable value. For example, if it is determined that, in order to provide a first service, a packet needs to be looped three times, then control device may (or may be used by a human to) program or configure stages in pipeline 280 (or possibly, just stage 270-E), such that the threshold for the relevant flow, service or application is four ("4"), and, accordingly, stage 270-E may loop a packet three times and, at the end of the third loop, send the packet over output 260, e.g., to another network node.

In some embodiments, the number and sizes of logical tables may be dynamically, on-the-fly, configured, programmed, set or modified. For example, to support many flows of a first type and a small number of flows of a second type, control device may (or may be used to) configure, define or create logical table 251-A such that it occupies or takes 80% of table 251 and may (or may be used to) configure, define or create logical tables 251-B and 251-K such that they occupy or take 15% and 5% of table 251, respectively. In some embodiments, the iteration thresholds and/or the number and/or sizes of logical tables may programmable, be set and/or modified on the fly, in realtime, e.g., these parameters may be set, in stages of pipeline 280 or in PPD 250, while PPD 250 receives and processes packets.

In some embodiments, a service, application or flow to be provided, supported or handled may be selected, or based on, an iteration parameter or value. For example, a mapping function that takes an iteration value into account as described may point to a first FSE when an iteration value of a packet is one ("1") and, for the same packet, the mapping function may point to a second, different FSE, when the iteration value of the packet is three ("3"). Accordingly, a first iteration value may cause stages in pipeline 280 to provide a first service based on a first FSE, and a second iteration value may cause the stages to provide a second, different service based on a second, different FSE.

In some embodiments, a state-table or a logical state table is selected, from a set of state-tables, based on the iteration value. From example, a first logical state table (e.g., 251-A) may be selected by stages in pipeline 280 for a first iteration value, and a second logical state table (e.g., 251-B) may be selected by the stages for a second, different iteration value. For example, a mapping function that takes an iteration value as input (or into account) as described may (e.g., using the mechanism or paradigm of a key as described) point stages in pipeline 280 to different FSEs (and consequently different states of different services or flows) based on respective different iteration values.

In some embodiments, first and second services may be chained by providing the first service for a first range of iteration values, and by providing the second service for a second, different range of iteration values. For example, chaining of services may include providing a first service for an incoming packet (e.g., one related to security) and, rather than sending the packet out through output 240, looping the packet back through pipeline 280 and providing (chaining) anther service, e.g., one related to gathering statistics, routing, load balancing etc. Of course, any number of services may be chained. For example, by causing stage 270-B to execute first and second different operations as described with reference to FIG. 4C, a PPD 250 can provide two (first and second) different services.

In some embodiments the number and/or order of chained services is set by associating a plurality of services with a respective plurality of iteration values ranges. For example, a mapping function as described may set the number and/or order of chained services by mapping the first service (or flow) in a chain with iteration values 0, 1 and 2, by mapping a second chained service with iteration values 3 and 4, by mapping a third service with iteration value 5, and so on. It will be noted that a mapping function, e.g., used by stages in pipeline 280, may be programmable, that is, a mapping function used by stages in pipeline 280 may be programmed, set and/or modified, e.g., by MU 210, in the stages, possibly in real time as described.

In some embodiments, first and second applications may be executed, supported or otherwise handled (e.g., by a stage in pipeline 280) by executing or handling the first application if the iteration value is within a first range of values, and by executing, supporting or handling the second application if the iteration value is within a second range of values. For example, pointed to different FSEs (e.g., in different logical tables as described), stages in pipeline may execute different applications for a looped packet. Similarly, first and second services may be supported or provided based first and second iteration values.

In some embodiments, the steps of applying a mapping-function to an incoming packet, processing the packet, modifying an iteration value and providing the packet to a device's ingress may be repeated until the iteration value or number reaches a predefined value or threshold. For example, the steps described may be repeated until the iteration value reaches a threshold, e.g., a threshold set in a memory 120 of PPD 250 by control device 205. For example, upon determining that a threshold value of an iteration value of a packet was reached, rather than looping the packet back to stage 270-A, stage 270-E may send a packet to another (e.g., a net hop, external or remote node) network node.

In some embodiments, processing a packet includes producing a modified packet, and the modified packet may be looped back, through an egress of a device back to an ingress of the device. For example, some of the stages in pipeline 280 may modify a packet as it traverses pipeline 280, and stage 270-E may receive the modified packet and send the modified packet back, through loopback 261, to an ingress of PPD 250.

In some embodiments, processing a packet may include adding metadata to the packet and processing the packet based on at least one of: the metadata, the iteration value and an attribute of the packet. For example, an iteration value may be added as metadata and processing a packet may be based on such metadata as described. As further described, processing a packet, e.g., by stages in pipeline 280, may be based on any other metadata that may be added to, or associated or provided with a packet.

It will be noted that, in addition to an iteration value as described, any other metadata may be added to, or associated with a packet as it is passed from one stage to another in pipeline 280. For example, metadata associated with, or included in a packet may include a "counter command" that maps a flow to a specific counter, a "policer command" that is used in applying policing (rate-limiting) based on its value, a quality of service (QOS) class value that used for determining drop and queuing preferences when a queue/port/other resource is oversubscribed etc.

In some embodiments, a mapping-function provides a reference to an entry in a state-table. For example and as described, a mapping function may map a packet to an logical table and to a specific FSE in the logical table.

In some embodiments, at least applying a mapping-function and modifying an iteration number are performed by a programmable pipeline device. For example, applying a mapping-function and modifying an iteration number may be performed by PPD 250, e.g., by components included in PPD 250 such as stages in pipeline 280.

In some embodiments, at least one action may be selected and performed based on information in an FSE. For example, when processing a packet, stage 270-C may perform a first set of one or more actions related to a first service described in a first FSE and stage 270-C may perform a second, different set of one or more actions related to a second, different service described in a second, different FSE, e.g., the first and second FSEs may be included in respective first and second logical tables as described.

In some embodiments, a stage in a pipeline may perform at least one of: adding an FSE to a state-table, removing an FSE from a state-table and updating an FSE in a state-table. For example, stages in pipeline 280 may create an FSE in logical table 251-A, remove an FSE from logical table 251-B, or modify an FSE in these tables. For example, stage 270-A may create an FSE in logical state table 251-A when a first packet of a new, yet unknown flow is received, stage 27-B may modify the FSE when the flows state changes, and stage 270-K may remove the entry when a flow (or session) is terminated. In some embodiments, control device adds, modifies and deletes FSEs as described.

In some embodiments, a first set of stages in a pipeline is used in a first iteration, and a second, different set of stages in the pipeline is used in a second, subsequent iteration. For example, stages 270-A, 270-B and 270-E may be used in a first loop or iteration (e.g., since logic in all other stages in pipeline 280 causes them to avoid processing the packet based on specific iteration value and FSE), and stages 270-A, 270-B, 270-C and 270-E may be used in a second, e.g., subsequent, loop or iteration. Some embodiments of the invention may use any sequence or combination of stages in processing a packet. A sequence of stages used by some embodiments may include a stage more than once and/or may include executing or activating stages according to any order, including an order that is different from the physical order, arrangement or connection of the stages. For example, representing sequences by letters, where "A" represents stage 270-A, "B" represents stage 270-B, and so on, by looping a packet as described and activating stages based on an iteration value, some embodiments of the invention may use sequences such as (A,C,D), (B,C,E,A,B) to process a packet.

In the description and claims of the present application, each of the verbs, "comprise" "include" and "have", and conjugates thereof, are used to indicate that the object or objects of the verb are not necessarily a complete listing of components, elements or parts of the subject or subjects of the verb. Unless otherwise stated, adjectives such as "substantially" and "about" modifying a condition or relationship characteristic of a feature or features of an embodiment of the disclosure are understood to mean that the condition or characteristic is defined to within tolerances that are acceptable for operation of an embodiment as described. In addition, the word "or" is considered to be the inclusive "or" rather than the exclusive or, and indicates at least one of, or any combination of items it conjoins.

Descriptions of embodiments of the invention in the present application are provided by way of example and are not intended to limit the scope of the invention. The described embodiments comprise different features, not all of which are required in all embodiments. Some embodiments utilize only some of the features or possible combinations of the features. Variations of embodiments of the invention that are described, and embodiments comprising different combinations of features noted in the described embodiments, will occur to a person having ordinary skill in the art. The scope of the invention is limited only by the claims.

While certain features of the invention have been illustrated and described herein, many modifications, substitutions, changes, and equivalents may occur to those skilled in the art. It is, therefore, to be understood that the appended claims are intended to cover all such modifications and changes as fall within the true spirit of the invention.

Various embodiments have been presented. Each of these embodiments may of course include features from other embodiments presented, and embodiments not specifically described may include various features described herein.

The invention claimed is:

1. A computer-implemented method of processing a packet, the method comprising:
   (a) defining a mapping-function that produces, based on a set of attributes of a network packet and based on an iteration value, a location of a flow state entry (FSE) in a state-table;
   (b) applying the mapping-function to an incoming network packet and processing the packet according to data in the FSE at the produced location;
   (c) modifying the iteration value; and
   (d) repeating steps b and c;
wherein, if the iteration value is smaller than a threshold value then providing a first service, and, if the iteration value is greater than the threshold value then providing a second service which is different from the first service.

2. The method of claim 1, wherein the threshold value is a programmable value.

3. The method of claim 1, further comprising selecting a service to provide based on the iteration value.

4. The method of claim 1, wherein the state-table is selected, from a set of state-tables, based on the iteration value.

5. The method of claim 1, further comprising chaining first and second services by:
   providing the first service for a first range of iteration values; and
   providing the second service for a second range of iteration values that is different from the first set of iteration values.

6. The method of claim 5, wherein the number and order of chained services is set by associating a plurality of services with a respective plurality of iteration values ranges.

7. The method of claim 1, further comprising executing first and second applications by:
   executing the first application if the iteration value is within a first range of values; and
   executing the second application if the iteration value is within a second range of values that is different from the first set of iteration values.

8. The method of claim 1, further comprising repeating steps b and c until the iteration number reaches a predefined value, wherein repeating steps b and c includes providing the packet to the device's ingress.

9. The method of claim 1, wherein processing the packet includes producing a modified packet, and wherein the method comprises looping the modified packet through an egress back to an ingress.

10. The method of claim 1, further comprising adding metadata to the packet and processing the packet based on at least one of: the metadata, the iteration value and an attribute of the packet.

11. The method of claim 1, wherein the mapping-function provides a reference to an entry in a state-table.

12. The method of claim 1, wherein applying the mapping-function and modifying the iteration number are performed by a programmable pipeline device.

13. The method of claim 1, further comprising performing at least one action, the action being selected based on information in the FSE.

14. The method of claim 1, further comprising performing at least one of: adding an FSE to a state-table, removing an FSE from a state-table and updating an FSE in a state-table.

15. The method of claim 1, wherein a first set of stages is used in a first iteration of steps b and c, and a second set of stages is used in a second, subsequent iteration of steps b and c.

16. A computer-implemented method of processing a network packet, the method comprising:
iteratively:
applying a mapping-function to a set of attributes of a network packet and to an iteration value to produce a reference to a flow state entry (FSE) in a state-table;
processing the packet according to information in the FSE; and
modifying the iteration value;
wherein, if the iteration value is smaller than a threshold value then providing a first service, and, if the iteration value is greater than the threshold value then providing a second service which is different from the first service.

17. A programmable pipeline device (PPD) adapted to:
receive a network packet; and
iteratively:
apply a mapping-function to a set of attributes of the packet and to an iteration value to produce a reference to a flow state entry (FSE) in a state-table;
process the packet according to information in the FSE; and
modify the iteration value;
wherein, if the iteration value is smaller than a threshold value then providing a first service, and, if the iteration value is greater than the threshold value then providing a second service which is different from the first service.

18. The PPD of claim 17, wherein the PPD is further adapted to execute first and second applications by:
executing the first application if the iteration value is within a first range of values; and
executing the second application if the iteration value is within a second range of values that is different from the first set of iteration values.

19. The PPD of claim 17, wherein the PPD is further adapted to:
add metadata to the packet;
process the packet based on at least one of: the metadata, the iteration value and an attribute of the packet; and
loop, through an egress of the PPD back to an ingress of the PPD, at least one of:
the packet, the metadata, a modified iteration value, an attribute of the packet and a modified packet produced by processing the packet.

* * * * *